Dec. 4, 1962                  O. E. GIBSON                  3,066,772
                            NAILABLE METAL STUD
                            Filed May 2, 1960
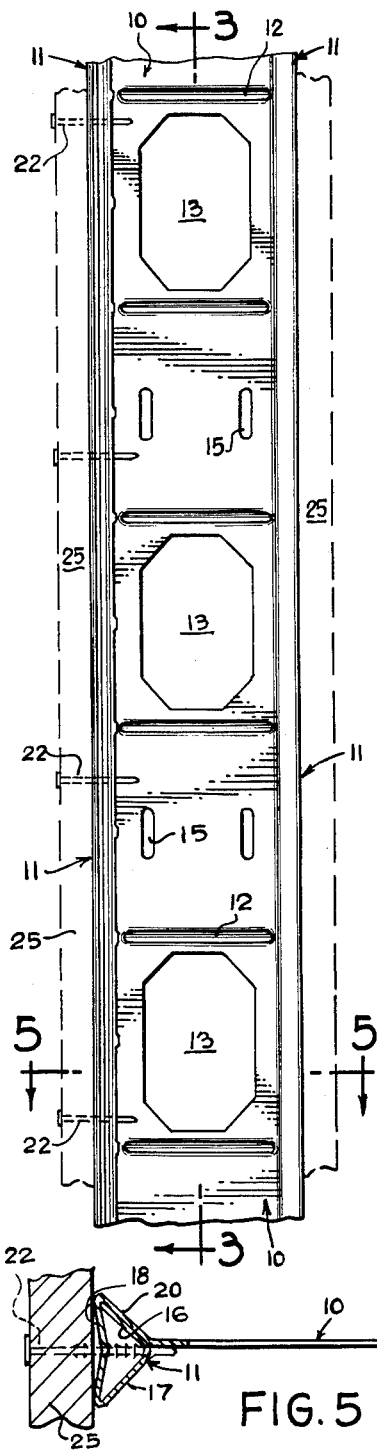
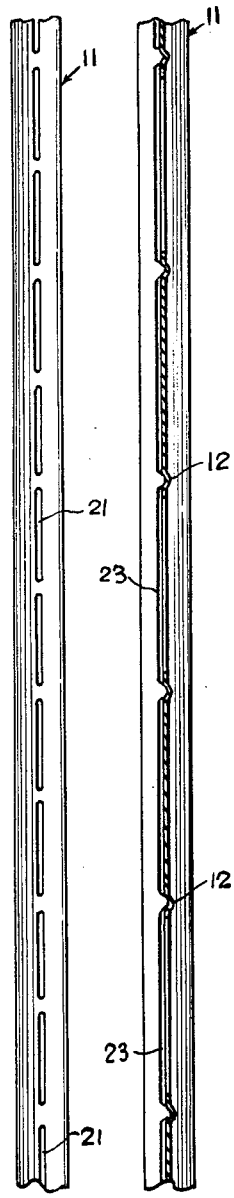
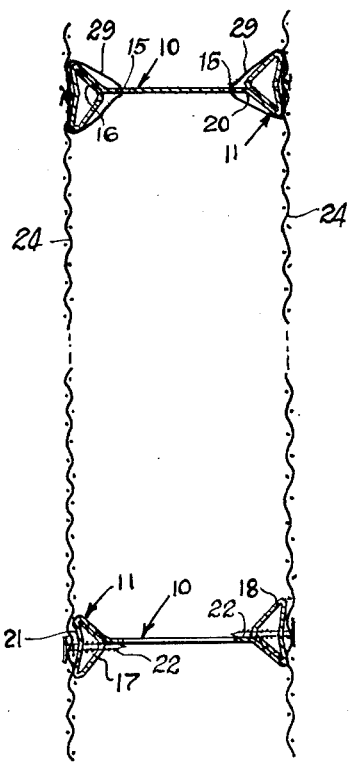
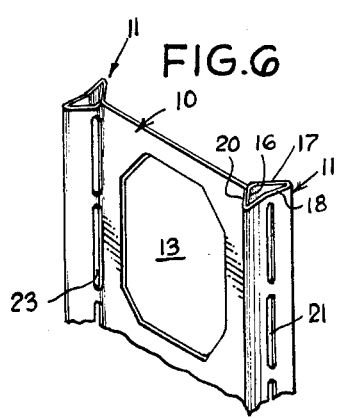
INVENTOR.
Oliver E. Gibson
BY Horton, Davis,
Brewer & Brugman
Attorneys

United States Patent Office 3,066,772
Patented Dec. 4, 1962

3,066,772
NAILABLE METAL STUD
Oliver E. Gibson, Skokie, Ill., assignor to Powell Steel Lath Corporation, Franklin Park, Ill., a corporation of Illinois
Filed May 2, 1960, Ser. No. 25,991
8 Claims. (Cl. 189—34)

This invention relates to nailable metal studs and particularly to integral one-piece metal studs for use in constructing partitions in buildings.

Wood wall studs have many undesirable characteristics, not the least of which is their high cost. In addition, wood studs, in order to be of reasonable price, are made from the lower grades of lumber and frequently are warped in one direction or another which makes proper installation difficult. Wood studs are also combustible, and they are sensitive to moisture which can change their shape and length subsequent to installation if they are installed in an environment that is too moist or too dry.

To obviate these and other difficulties, metal studs of various forms have been employed. To be adequate, a metal stud should be made to replace wood for supporting either lath and plaster walls, dry wall or plaster board construction or even wood panelling. A metal stud to support plaster board, rock lath or panelling should be nailable, that is, it should be shaped and constructed so that installation may be accomplished by driving a suitable fastener through the board and through the stud with ordinary tradesmens' tools and skills.

Nailable metal studs heretofore employed fall generally into two classes. One class is those that hold nails by friction or spring action. Metal studs of this variety generally have as elements of their structure two separate rounded pieces of metal that are forced together by spring action along a longitudinal seam. A nail driven into this seam forces these metal elements apart and the spring action of the elements in attempting to restore themselves to their original position causes them to bear against the side of the nail thus holding it in place by friction. Metal studs of this type are characterized by being formed of multiple pieces of metal that must be assembled with rivets, bolts, welds, etc., and by producing a joint that requires at least as much force to drive the nail as is required to remove it.

Another class of nailable stud is that class based upon distortion of a nail to hold it in place. A typical stud of this kind provides a tortuous channel into which the nail is driven. In passing through this channel the nail is distorted away from its longitudinal axis first in one direction and then in another, preferably back in alignment. There results a bent nail in a crooked channel and the nail holds by engaging the channel walls. Studs of this class are characterized by requiring as much force to drive the nail as is required to remove it. They are also characterized by being constructed of several pieces of metal which must be assembled and connected together and by producing a connection between the stud and the wall panel that has a slight amount of play in it due to the small spring-back that is characteristic when distorting a metal member. In other words, whenever the nail is bent as it is driven, it will spring back slightly from its maximum point of penetration.

It is an object of this invention to provide a nailable stud that holds suitable nails or fasteners very firmly, requiring much more force to remove them than to drive them.

It is another object of this invention to provide a nailable stud which is made of a single piece of sheet metal and may be manufactured only by bending and without fastening various members together or other assembly operations.

It is another object of this invention to provide a nailable stud that may be used with suitable nails or fasteners and in which the fasteners are double locked in their ultimate holding position.

It is another object of this invention to provide a stud that is usable with plaster board construction, with other panelling or with lath and plaster construction.

It is another object of this invention to provide a nailable stud which may employ nails of varying lengths that may even extend past the center axis of the stud.

These and other objects are obtained by the nailable stud of this invention which is characterized by being formed from a single sheet of metal having a web portion and at least one, but preferably two, side portions. The side portions are parallel to each other, are integral with the opposite margins of the web and extend the length of the stud. In cross section, each side portion is in the general shape of a hollow isosceles triangle which has its apex, that is the angle between equal-length legs, offset from and adjacent the plane of the web and which has its base, that is the side opposite the apex, perpendicular to the plane of the web. The base of the triangle is perforated with holes or preferably elongated slots and the apex of the triangle is similarly perforated, and the perforations in the base are positioned with respect to those in the apex so that the plane through the centers of both is parallel to the plane of the web. In a preferred embodiment the base of the triangle has a concave contour that runs the length of it and forms a trough approximately equidistant from its margins, and the perforations in the base occur at the trough of this concavity.

With this construction a nail driven into a slot in the base will pass through the triangle and through the slot at the apex of the triangle so that the axis of the nail is parallel to but adjacent the plane of the web. It is preferred that the other side portion be arranged to have nails driven through it adjacent the opposite face of the web. The concavity in the base of the triangle will guide the nail through the slot and the sharply sloping side walls of the triangle will act as a cam to guide the nail to the slot in the apex of the triangle.

When the nail is larger in diameter than the width of the slot, in passing through the slot in the base and the slot at the apex, it will tend to spread those openings and pass through them with ease. In attempting to withdraw the nail, however, the sharp edges of the slots will bite the sides of the nail and the withdrawing movement will tend to close the slots and produce an even tighter grip on the nail. This construction produces the effect of having a nail that is much harder to withdraw than it is to drive and additionally the nail will always be held with an extremely strong double grip at the point of maximum penetration. The use of nails having circumferential ridges, known as annular nails, will produce a strong connection between the stud and the panel as will nails, staples, screws or other fasteners having some form of surface irregularity.

In this description, the cross section of the side portions is described as a generally isosceles triangle and the side walls are described as generally equal-length legs. In forming sheet metal for uses such as this, where precise dimensions are not required, it is unreasonable to limit contours and dimensions more closely than the fabrication modes practiced in the art can produce, and it is accordingly not intended that precise adherence to these definitions be limitations of this invention. Therefore, when words such as "equal length" are employed, approximate equal length or equal length within the tolerance of ordinary sheet metal work is intended. It is also intended that reference to the legs, base or apex of the triangle shall mean the elongated elements that form these shapes in cross section.

Other objects and advantages of the invention will be apparent from the following description and the accompanying drawings in which similar characters of reference indicate similar parts throughout the several views.

FIG. 1 is a partial front view of a nailable metal stud representing one embodiment of this invention;

FIG. 2 is an end view of the stud of FIG. 1;

FIG. 3 is a sectional view of FIG. 1 taken along the line 3—3;

FIG. 4 is a partial sectional plan view illustrating the positional relationships of studs assembled in a partition;

FIG. 5 is a partial sectional plan view of a single stud assembled in a partition; and FIG. 6 is a perspective view of a segment of the stud of FIG. 1.

The preferred nailable stud of this invention consists generally of a web member 10 and two identical but symmetrically placed side members 11. The entire stud is bent from a single piece of sheet metal and accordingly side members 11 are intergal with web member 10 and connected to it along the entire length at the margins of web member 10. The web member may, but need not have, stiffening contours 12 which, in this embodiment, consist of integral transverse indentations or corrugations formed in the web. The web member also contains openings 13 to facilitate passage of electric conduit, wires, pipes, or other utility supplying means through the walls. The web member 10 also contains small lathing attachment holes 15 for use when lath and plaster construction is to be employed.

The sheet from which the stud is made is formed into four elongated segments along each edge to form isosceles triangles with the first segment overlapped by the last segment. The triangular side members 11 consist of a first segment 16 which is one of the overlapping sides of an equal-length leg, a second segment 17 which is the other equal-length leg of the isosceles triangle, a third segment 18 which forms the base of the isosceles triangle and a fourth segment 20 which overlaps the first segment 16 of the triangular section. In a preferred embodiment the base segment 18 is concave with the trough of the concavity running lengthwise of the side member.

The isosceles triangle is slightly offset to one side of the plane of the web 10, so that it is not symmetrical thereto and its apex thus is out of alignment with the plane of the web 10. Nevertheless, the plane of the segment 18 of each triangle is generally perpendicular to the plane of the web 10. Also, preferably, as best shown in FIG. 5, the opposite side members are offset on opposite sides of the web 10, so that nails driven through the opposite side members will lie adjacent opposite faces of the web.

Perforations 21, which may be holes or slots, are provided at the bottom of the concavity or the trough, in the base segment 18 of the side members. These perforations are smaller, in their minimum or lateral dimension, than the diameter or the smallest lateral dimension of the nails 22 which are employed in conjuction with them. Perforations 23, which are also either holes or slots, and which are of substantially the same dimensions as the slots 21 in the base segment 18 and are preferably in longitudinal register with the perforations 21, are at the apex of the triangular section between legs 16 and 17 of the side members. Thus, the fastener 22 driven into the side member 11 will pass first through a perforation 21, slightly spreading this perforation as it passes through, and then through the hollow space within the triangular side member, and finally through the perforation 23, slightly spreading this perforation as it passes through. The fastener 22 is held not only by the friction of the distorted metal against its side, but the angle of the metal walls 16 and 17 as well as the sloping portions of the base segment 18 will cause the perforations to become smaller and bite the side of the nail to resist motion that tends to withdraw the nail. Thus, the structure of this invention has gripping action which requires much greater force to remove a fastener than is required to drive it and as a consequence it affords an extremely firm grip to hold paneling, plaster board or metal lath 25 in place. Through this construction, not only is the nail double locked, once at the base segment 18 and once at the apex, but it may extend any length beyond the apex and thus no critical length of nail is required.

The nailable stud of this invention, as best shown in FIG. 5, may be used interchangeably with a wood stud to hold panelling 24 on both sides of the stud. To conform with established buliding dimensions it is preferred that the lateral dimension of the stud be approximately 3⅝″, which is the width of a wood 2 x 4, however this dimension is simply a matter of convenience and forms no significant part of this invention. The studs are contemplated as being erected between top and bottom plates and are further contemplated as being secured to the top and bottom plates by metal members which are connected to the plates and shaped to hold the ends of the stud members securely. It is contemplated that any suitable known and commercially available holding member may be used for this purpose. The nailable studs of this invention may be formed of any suitable material, preferably galvanized sheet metal.

When the stud members of this invention are employed with lath and plaster construction, rock lath may be nailed directly to the studs as heretofore described and in the case of expanded metal, the lathing is wired, stapled, nailed or clipped to the studs. As best shown in FIG. 4, the nailable studs of this invention may also be employed with latch and plaster construction. Metal lath 24, which may be expanded metal sheet, wire mesh or the like, may be fastened to the stud with nails 22, or it may be fastened through holes 15 with wires, clips or the like as illustrated at 29. After the lath is firmly in place, a layer of plaster is applied for the finished surface by conventional techniques.

From the foregoing description it may be seen that this invention provides an improved nailable metal stud that is inexpensively made by forming a single sheet of metal. The stud of this invention provides an extremely firm, double locked grip on the nail that requires more force to remove than is required to drive, and one which holds firmly at the point of maximum penetration.

Having thus described this invention, what is claimed is:

1. A one-piece nailable metal stud comprising a web portion and a laterally expanded side portion integral with and connected to the margin of said web portion, said side portion having a cross section generally describing a hollow isosceles triangle having generally equal-length legs projecting from an apex adjacent the plane of said web portion and having the base of said triangle generally perpendicular to the plane of said web portion, said base having a longitudinal concavity with a plurality of openings in the trough of said concavity, a plurality of openings along the apex portion of said triangle aligned longitudinally and adjacent the plane of said web with the openings in the apex and the openings in the trough aligned to lie in a plane parallel to the plane of said web.

2. A one-piece nailable metal stud comprising a web portion and a laterally expanded side portion integral with and connected to the margin of said web portion, said side portion having a cross section generally describing a hollow isosceles triangle formed by the edge of a sheet metal piece bent into four elongated segments with the first segment lapping under the last segment, the equal-length legs of said triangular cross section projecting from a point adjacent the plane of said web and the base of said triangular cross section being generally perpendicular to the plane of said web portion, said base being longitudinally concave with the trough of the concavity being generally equidistant between the edges of said base, a plurality of slots running the length of said concavity in the trough thereof, a plurality of slots running the length of the apex portion of said triangle between the first and second of said segments and adjacent the plane of said web portion with the axes of the slots in said trough and the slots in said apex lying in a plane parallel to the plane of said web and with the slots in said trough and the slots in said apex in longitudinal register.

3. The nailable metal stud of claim 1 further characterized in that a side portion is connected to each side of said web portion.

4. The nailable metal stud of claim 1 further characterized in that a side portion is connected to two opposite margins of said web portion and the side portions on opposite sides of said web portion are positioned to have the perforations therein aligned with their axes adjacent opposite sides of said web.

5. A nailable metal stud comprising a web portion and a laterally expanded side portion connected to the margin of said web portion, said side portion having a cross section generally describing a hollow isosceles triangle with generally equal-length leg segments projecting from a point adjacent the plane of said web and with the base segment of said triangle generally perpendicular to the plane of said web, a plurality of openings running the length of said base segment, a plurality of openings running the length of the apex of said triangle with the axes of the openings in said base segment and in said apex lying in a plane parallel to the plane of said web.

6. A one-piece nailable metal stud comprising a web portion and a side portion integral with and connected to an edge of said web portion, said side portion having longitudinal angular elements diverging from an apex which is adjacent to the margin of said web and offset from the plane of said web, the side portion also having a longitudinally extending connecting element integrally adjoining the edges of said angular elements that are opposite the apex, an opening in the mid-portion of said connecting element, an opening at said apex, the axes of the openings in the mid-portion of said connecting element and at said apex being aligned in a plane offset from the plane of said web.

7. The nailable stud of claim 6 further characterized in that side portions of like structure are connected to the opposite long sides of said web portion.

8. The nailable metal stud of claim 6 further characterized in that side portions of like structure are connected to opposite margins of said web portion and the said side portions on opposite sides of said web portion have the openings at their respective apexes which are on opposite sides of said web.

References Cited in the file of this patent

UNITED STATES PATENTS

| | | |
|---|---|---|
| 1,064,363 | Moore | June 10, 1913 |
| 2,317,955 | Donley | Apr. 27, 1943 |
| 2,605,867 | Goodwin | Aug. 5, 1952 |
| 2,931,470 | Brown | Apr. 5, 1960 |